United States Patent
Alvarez Rivera et al.

(10) Patent No.: US 8,965,449 B2
(45) Date of Patent: Feb. 24, 2015

(54) DEVICES AND METHODS FOR PROVIDING ACCESS TO INTERNAL COMPONENT

(75) Inventors: Felix Jose Alvarez Rivera, San Jose, CA (US); Richard Hung Minh Dinh, Cupertino, CA (US); Scott A. Myers, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 812 days.

(21) Appl. No.: 13/082,118

(22) Filed: Apr. 7, 2011

(65) Prior Publication Data

US 2012/0258773 A1 Oct. 11, 2012

(51) Int. Cl.
*H04M 1/00* (2006.01)
*G06F 1/16* (2006.01)
*G06F 21/32* (2013.01)
*G06F 21/83* (2013.01)
*H04L 29/06* (2006.01)
*H04W 12/06* (2009.01)

(52) U.S. Cl.
CPC ............. *G06F 1/1656* (2013.01); *G06F 21/32* (2013.01); *G06F 21/83* (2013.01); *G06F 1/1684* (2013.01); *H04L 63/0861* (2013.01); *H04W 12/06* (2013.01); *G06F 2221/2101* (2013.01)
USPC ...................... 455/552.1; 455/566; 455/556.2; 455/550.1

(58) Field of Classification Search
CPC ........................ H04W 12/00; G06K 9/00006
USPC ............ 455/556.1, 556.2, 550.1, 566, 552.1, 455/410, 411, 414.1, 418; 370/329, 401; 345/58, 82, 522, 589, 173, 6, 629
See application file for complete search history.

(56) References Cited

U.S. PATENT DOCUMENTS

| 7,215,881 B2 | 5/2007 | Borngraber et al. |
| 7,447,772 B2 | 11/2008 | Natsuno et al. |
| 2007/0255961 A1* | 11/2007 | Tracy et al. .................. 713/186 |

(Continued)

FOREIGN PATENT DOCUMENTS

| EP | 1850205 | 10/2007 |
| KR | 20-1999-0025961 | 7/1999 |

(Continued)

OTHER PUBLICATIONS

International Search Report and Written Opinion dated Sep. 26, 2012, PCT/US2012/031663, 18 pages.

(Continued)

*Primary Examiner* — John J Lee
(74) *Attorney, Agent, or Firm* — Brownstein Hyatt Farber Schreck, LLP

(57) ABSTRACT

Systems, methods, and devices are disclosed for applying concealment of components of an electronic device. In one embodiment, an electronic device may include a component that is disposed behind a window configured to selectively become transparent or opaque, such as a polymer-dispersed liquid crystal (PLDC) window. The component includes an image capture device, a strobe flash, a biometric sensor, a light sensor, a proximity sensor, or a solar panel, or a combination thereof. Additionally, the electronic device includes data processing circuitry configured to determine when an event requesting that the component be exposed occurs. Furthermore, the electronic device includes a window controller that may control the window to become transparent, to expose the component upon the occurrence of the event requesting that the component be exposed.

18 Claims, 13 Drawing Sheets

(56) References Cited

U.S. PATENT DOCUMENTS

| | | | |
|---|---|---|---|
| 2008/0266773 A1* | 10/2008 | Szolyga et al. | ............... 361/683 |
| 2009/0273562 A1 | 11/2009 | Baliga et al. | |
| 2010/0066928 A1 | 3/2010 | Pelfrey | |

FOREIGN PATENT DOCUMENTS

| | | |
|---|---|---|
| KR | 10-2003-0014946 | 2/2003 |
| WO | WO 02/103504 | 12/2002 |
| WO | WO 2008/030976 | 3/2008 |

OTHER PUBLICATIONS

Korean Office Action dated Sep. 26, 2014, KR 10-2013-7028335, 14 pages.

* cited by examiner

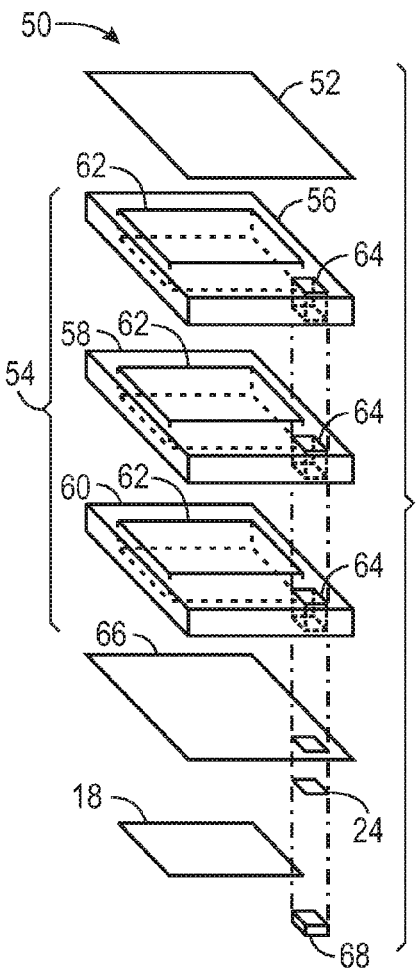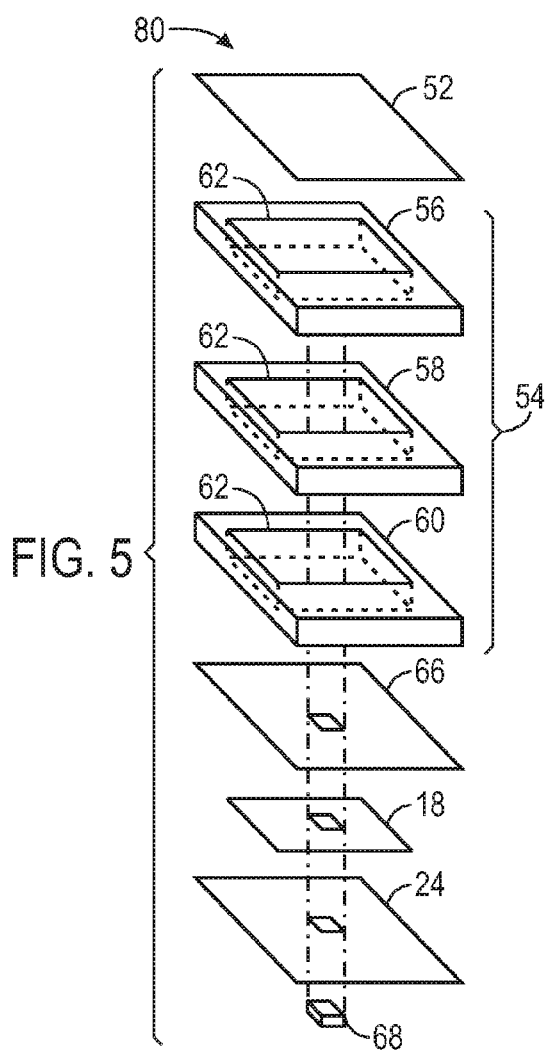

DEVICES AND METHODS FOR PROVIDING ACCESS TO INTERNAL COMPONENT

BACKGROUND

The present disclosure relates generally to the industrial design of an electronic device and, more particularly, to techniques for hiding components of an electronic device behind a window, such as a polymer-dispersed liquid crystal (PDLC) window, while such components are not in use.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices are becoming more and more sophisticated, capable of performing a multitude of tasks from image capture to identity verification through biometric sensors. Providing increased functionality often involves adding components to such electronic devices. However, adding more components can lead to a cluttered, unattractive electronic device.

Current techniques for incorporating components into an electronic device may be limited by the relative sizes of the components and the electronic device. The larger the components and the smaller the electronic device, the less spatial area there may be to incorporate additional components. For example, a small electronic device where a large display covers most of the face of the electronic device may not allow for any additional components, such as a fingerprint reader, to be added to the electronic device. Furthermore, under the current techniques, adding new components may harm the aesthetic appeal of the device by cluttering the electronic device enclosure, even though these additional components may be seldom or never used by many users. An electronic device that incorporates multiple components may lose its aesthetic appeal when covered by visible components, particularly as compared to a seamless electronic device where very few, if any, components of the electronic device are visible.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to techniques for concealing components of an electronic device behind a window that can change between opaque and transparent configurations, such as a polymer dispersed liquid crystal (PDLC) window. Since such a window may be hidden behind a transparent display or color-matched to seamlessly integrate into an enclosure of the electronic device, the components may remain hidden from view while not in use. When desired, the electronic device may expose the concealed components by causing the electronic window to change opacity, allowing the components to suddenly appear as from out of nowhere. In accordance with one embodiment, an electronic device may include a window with a component of the electronic device disposed behind the window. Upon detecting an event associated with the component, a window controller may make transparent, or "open," the window to expose the component. To provide one example, such an event may occur when a feature of the electronic device requests exposure of concealed components. For example, when an image capture application of the electronic device is not in use, an image capture device and/or associated strobe may remain hidden behind an electronic window in the enclosure of the electronic device. Upon detecting this request, the window controller may open the window, causing the image capture device and/or the associated strobe to suddenly appear from out of the enclosure.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 4 is an exploded view representing layers of an electronic device enclosure capable of concealing a component behind a window in the enclosure as disclosed herein, in accordance with an embodiment;

FIG. 5 is an exploded view representing layers of an electronic display capable of concealing a component behind a window and transparent display as disclosed herein, in accordance with an embodiment;

DETAILED DESCRIPTION

Figure 1:
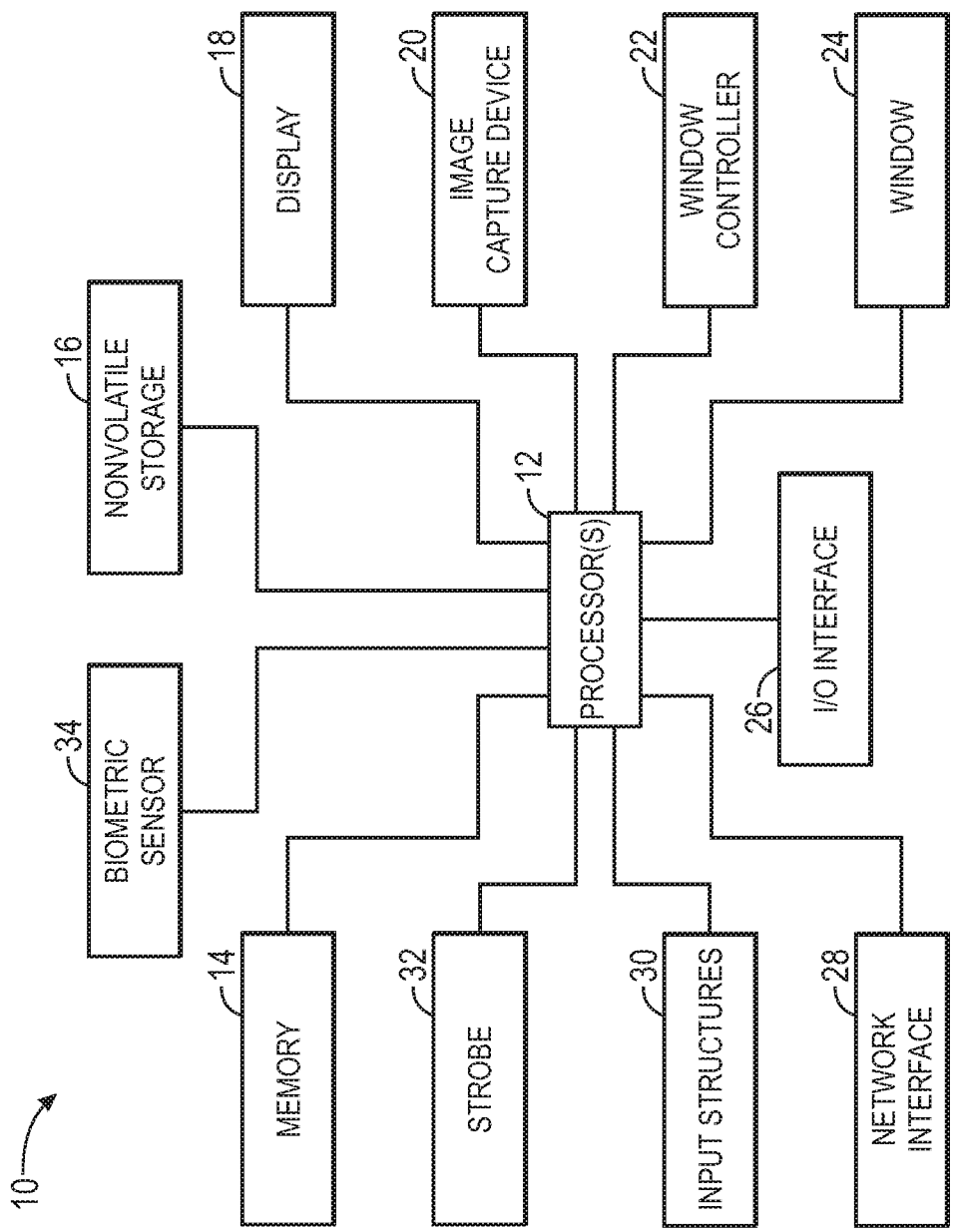
FIG. 1 is a block diagram of an electronic device capable of performing the techniques disclosed herein, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure generally provides techniques for enhancing the functionality and aesthetic appeal of an electronic device by concealing components of the electronic device behind a window (e.g., a PDLC window). To avoid cluttering the enclosure of an electronic device with various seldom-used components, many different electronic device components may be concealed behind one or more window(s) in the electronic device. Perhaps most noteworthy are components that have traditionally required external exposure to light or that emit light. For example, these "visually-dependent components" may include a fingerprint scanner, an image capture device, a strobe, a light sensor, a proximity sensor, or a solar panel. Each of these components depend on light input or output and thus have traditionally had at least a visual input or output portion of the component externally exposed when incorporated into an electronic device. Using the current techniques, these visually-dependent components may be configured to be exposed only when desired, and otherwise may remain hidden from view. These visually-dependent components may remain hidden while the window is "closed," meaning to be controlled to be substantially opaque. These components may become exposed when the window is "opened," meaning to be controlled to be substantially transparent.

Disposing components of an electronic device behind a window may provide an aesthetic benefit to the electronic device by allowing the components to remain unseen and hidden behind the window until access to the component is desired, creating a more seamless electronic device. Furthermore, the current techniques provide for exposure of components behind a transparent display of the electronic device, providing aesthetic value by allowing exposure to the component from areas that a user would traditionally not expect, such as behind an electronic device display. Moreover, by increasing the potential areas where a component may be disposed, it may be possible to add additional components to an electronic device that otherwise would not fit.

Figure 2:
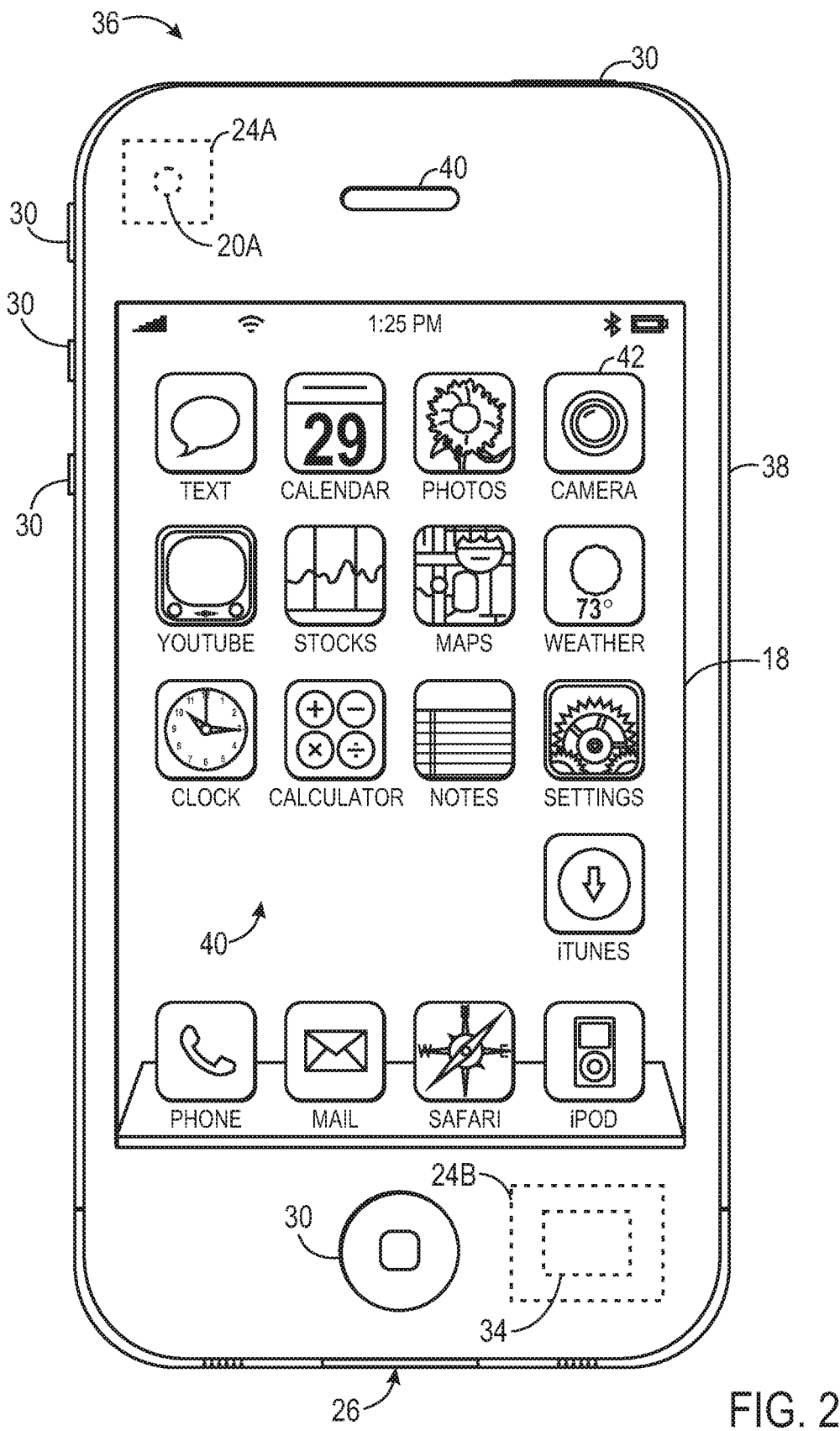
FIG. 2 is a schematic front view of a handheld device representing one embodiment of the electronic device of FIG. 1.
Figure 3:
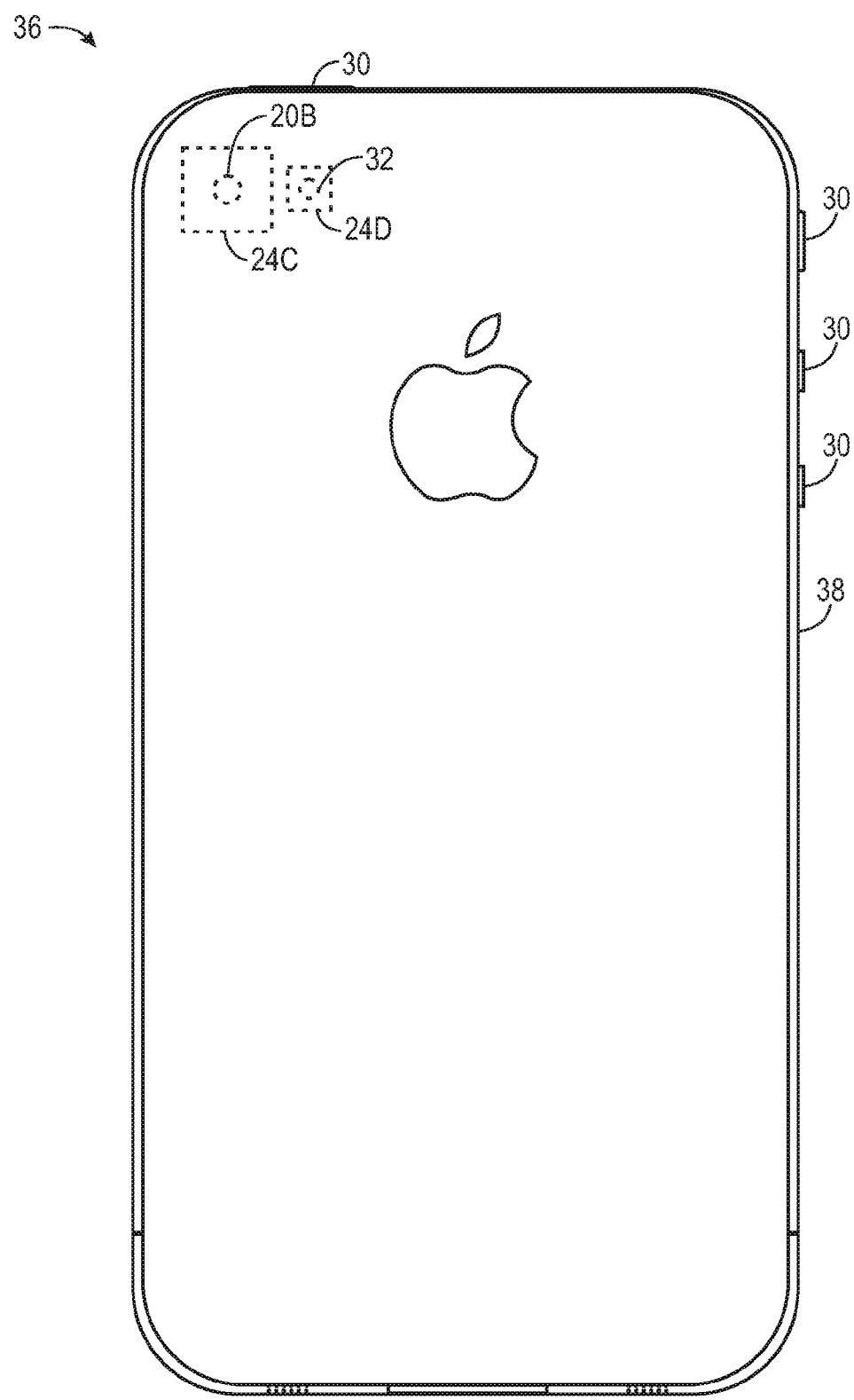
FIG. 3 is a schematic back view of the handheld device illustrated in FIG. 2.

With the foregoing in mind, a general description of suitable electronic devices for performing the presently disclosed techniques is provided below. In particular, FIG. 1 is a block diagram depicting various components that may be present in an electronic device suitable for use with the present techniques. FIGS. 2 and 3 represent one example of a suitable electronic device, which may be, as illustrated, a handheld electronic device having component concealment capabilities.

Turning first to FIG. 1, an electronic device 10 for performing the presently disclosed techniques may include, among other things, one or more processors 12, memory 14, non-volatile storage 16, a display 18, image capture device(s) 20, a window controller 22, one or more window(s) 24, an I/O interface 26, a network interface 28, input structures 30, a strobe 32, and a biometric sensor 34 (e.g., a fingerprint reader). As will be discussed further below, the window controller 22 may be configured to open a window 24 disposed above certain of these components, such as image capture device(s) 20, a strobe 32, and/or a biometric sensor 34. The various functional blocks shown in FIG. 1 may include hardware elements (including circuitry), software elements (including computer code stored on a computer-readable medium) or a combination of both hardware and software elements. Further, FIG. 1 is only one example of a particular implementation and is merely intended to illustrate the types of components that may be present in the electronic device 10.

Before continuing, it should be understood that the system block diagram of the electronic device 10 shown in FIG. 1 is intended to be a high-level control diagram depicting various components that may be included in such an electronic device 10. That is, the illustrated connection lines between each individual component shown in FIG. 1 may not necessarily represent paths or directions through which data flows or is transmitted between various components of the electronic device 10. Indeed, as discussed below, the depicted processor(s) 12 may, in some embodiments, include multiple processors, such as a main processor (e.g., CPU), and dedicated image and/or video processors.

The processor(s) 12 and/or other data processing circuitry may be operably coupled with the memory 14 and the non-volatile storage 16 to perform various algorithms for carrying out the presently disclosed techniques. Such programs or instructions executed by the processor(s) 12 may be stored in any suitable manufacture that includes one or more tangible, computer-readable media at least collectively storing the instructions or routines, such as the memory 14 and the non-volatile storage 16. In example, non-volatile storage 16 may include ROM, CD-ROM, or RAM. Also, programs (e.g., an operating system) encoded on such memory 14 or non-volatile storage 16 may also include instructions that may be executed by the processor(s) 12 to enable the electronic device 10 to provide various functionalities, including those described herein.

The display 18 may be a touch-screen display that may enable users to interact with a graphical user interface of the electronic device 10. The display 18 may be any suitable type of display, such as a liquid crystal display (LCD), plasma display, or a transparent organic light emitting diode (OLED) display, for example. The I/O interface 26 may enable the electronic device 10 to interface with various other electronic devices, as may the network interface 28. The network interface 28 may include, for example, an interface for a personal area network (PAN), such as a Bluetooth network, for a local area network (LAN), such as an 802.11x Wi-Fi network, and/or for a wide area network (WAN), such as a 3G or 4G cellular network.

The image capture device(s) 20 may include a digital camera configured to acquire still and/or moving images (e.g., video). The image capture device(s) 20 may include a lens and one or more image sensors configured to capture and convert light into electrical signals. By way of example, the image sensor may include a CMOS image sensor (e.g., a CMOS active-pixel sensor (APS)) or a CCD (charge-coupled device) sensor. Generally, the image sensor in the image capture device(s) 20 may include an integrated circuit having an array of pixels, wherein each pixel includes a photodetector for sensing light from an image scene. The functionality of the image capture device(s) 20 may be enhanced by the use of a strobe 32. The strobe 32 may include a light emitting diode (LED) light source configured to illuminate the subject of the image capture device(s) 20.

The biometric sensor 34, such as a fingerprint reader, may be configured to take an optical scan of a subject and compare the scanned image to a stored image. The stored image data may be retrieved from the memory 14 and/or non-volatile storage 16. Based on the scan by the biometric sensor 34, the electronic device 10 may verify the identity of the user. Identity verification may provide a more secure electronic purchase method as well as a more secure unlocking method for the electronic device 10.

Rather than clutter the electronic device 10, certain components such as the image capture device(s) 20, strobe 32, and biometric sensor 34 may be disposed behind one or more window(s) 24, hidden from view when not in use. The window(s) 24 may be tailored to any shape or size suitable for concealing the underlying components. The window(s) 24, when closed, are opaque. When opened, the window(s) 24 become transparent, exposing these components disposed behind the window 24. For example, as shown by a handheld device 36 of FIGS. 2 and 3, which represents one embodiment of the electronic device 10 of FIG. 1, a window 24A may conceal the image capture device 20A, a window 24B may conceal a biometric sensor 34, a window 24C may conceal an image capture device 20B, and a window 24D may conceal a strobe 32. These windows 24A, 24B, 24C, and 24D may be opened only around the components over which they are disposed. That is, although the windows 24A, 24B, 24C, and 24D are shown in FIGS. 2 and 3 to be rectangular in shape, these windows 24A, 24B, 24C, and 24D may be designed to open in a shape corresponding to the components that they conceal.

The handheld device 36 of FIGS. 2 and 3 may represent, for example, a cellular phone, a portable phone, a media player, a personal data organizer, a handheld game platform, a tablet computer, a notebook computer, or any combination of such devices. By way of example, the handheld device 36 may be a model of an iPad®, iPod®, iPhone®, or Macbook® available from Apple Inc. of Cupertino, Calif. FIG. 2 depicts the front of handheld device 36, while FIG. 3 depicts the back of handheld device 36.

The handheld device 36 may include an enclosure 38 to protect interior components from physical damage and to shield them from electromagnetic interference. The enclosure 38 may include windows 24A and 24B configured to conceal components such as an image capture device 20 and biometric sensor 34, respectively. By concealing the image capture device 20 and the biometric sensor 34 behind the enclosure 38, these components may remain unseen when not in use. For example, when the image capture device 20 and the biometric sensor 34 are not in use, they may be concealed by selectively causing the windows 24A and 24B to be opaque, or "closed." Since the windows 24A and 24B may be color-matched so as to be indistinguishable from the enclosure 38, the enclosure 38 may appear seamless when the windows 24A and 24B are closed. When a concealed component is to be in use, such as image capture device 20 and/or biometric sensor 34, they may be exposed from beneath the enclosure 38 by selectively causing the windows 24A and/or 24B to become transparent, or "open." Components such as the image capture device 20 and the biometric sensor 34 may be exposed for as long as desired.

In some embodiments, components of the handheld device 36, such as the image capture device 20 and the biometric sensor 34, may be selectively exposed when certain component-using features of the handheld device 36 are activated. By way of example, an image capture feature of the handheld device 36, which may employ the image capture device 20, may become activated when a user elects to run a camera application selectable via a graphical user interface (GUI) 40. In general, the GUI 40 may include one or more icons 42 for providing access to features of the handheld device 36 (e.g., applications, features of an operating system of the handheld device 36, features of firmware of the handheld device 36, and so forth). At times during the use of such features, the features may utilize components of the handheld device 36 that may be hidden behind a window 24 (e.g., the image capture device 20 hidden behind the window 24A or the biometric sensor 34 hidden behind the window 24B). Thus, in some embodiments, when the handheld device 36 detects that a feature (e.g., a camera application) that is expected to use a hidden component (e.g., the image capture device 20) has been selected via the GUI 40, the window controller 22 of FIG. 1 may open the associated window 24 (e.g., the window 24A). When the handheld device 36 detects that the utilization of the component (e.g., the image capture device 20) is no longer desired by the feature of the handheld device 36 (e.g., the camera application is closed), the window controller 22 may close the window 24, hiding the component.

The technique of exposing concealed components is not limited to dynamically changing window 24 opacity upon the launch of applications within the electronic device 10. For example, as illustrated in FIG. 3, the back of the handheld device 36 may have two windows 24C and 24D disposed above an image capture device 20 and a strobe 32, respectively. Other embodiments may include more or fewer windows 24 and corresponding concealed components. Initially, the windows 24C and 24D may conceal the image capture device 20 and the strobe 32. In one embodiment, the window 24C disposed above the image capture device 20 may be opened by the window controller 22 upon selection of the icon 42 of FIG. 2 linking to the camera application. The window 24D disposed above the LED strobe 32 may remain closed until the camera application determines that increased illumination is desired. Upon such a determination, the camera application may provide some indication to the window controller 22 that the window 24D disposed above the LED strobe 32 should be opened. The window controller 22 may "open" the window 24D disposed above the LED strobe 32 by making the window 24D transparent, exposing the LED strobe 32 for use. Upon determining that the strobe 32 is no longer desired for use, the camera application may provide some indication to the window controller 22 that the window 24D should be closed. The window controller 22 then may cause the window 24D disposed above the LED strobe 32 to "close," becoming opaque and hiding the LED strobe 32. Upon completion of the use of the image capture device 20, the window controller 22 may also close the window 24C disposed above the image capture device 20, causing the image capture device 20 to disappear into the enclosure 38.

In some embodiments, even the display 18 of an electronic device 10 may be concealed. For example, FIGS. 16A and B illustrate a handheld device 36 having a window 24 disposed above a display 18. As shown in FIG. 16A, when the display 18 is not in use, the window 24 may remain closed, hiding the display 18 and giving the appearance of a single seamless enclosure without a display 18. When the display 18 is activated, the window 24 may be opened, exposing the display 18, as shown in FIG. 16B. By way of example, the display 18 may be activated when a user selects certain of the input structures 30 of the handheld device 36.

Window(s) 24 may conceal components in the enclosure 38 and/or, when the display 18 is transparent (e.g., a transparent OLED display), under the display 18 of the electronic device 10. For example, FIG. 4 depicts an enclosure system 50 in which window(s) 24 may hide certain components of an electronic device 10, while FIG. 5 depicts an electronic display system 80 in which window(s) 24 may hide certain components of an electronic device 10. The enclosure system 50 may represent one embodiment of the enclosure 38 of the handheld device 36 depicted in FIG. 2, but may be used as an enclosure for any suitable embodiment of the electronic device 10.

In both the enclosure system 50 and the electronic display system 80, a transparent protective cover layer 52 is disposed above all other layers of the enclosure 38 to provide protection to the underlying layers. The transparent protective cover layer 52 may be made of a transparent material such as glass or plastic and may protect lower layers of the enclosure system 50 from wear. Several printing layers 54 beneath the transparent protective cover layer 52, including an ambient light layer 56, an infrared layer 58, and a color layer 60, may be printed beneath transparent protective cover layer 52. The ambient light layer 56 may provide an indication of the current level of visible light in the immediate environment outside the device. The infrared layer 58, which may be capable of detecting infrared radiation, may be disposed beneath the ambient light layer 56. A color layer 60 may be disposed beneath the infrared layer. The color layer 60 provides the color to the enclosure. For example, a black enclosure system 50 would have a black color layer 60. Each of the printing layers 54 may have display cutouts 62 above a display 18 to allow the display to be seen through the protective cover layer 52. A capacitive touch layer 66, protected beneath the transparent protective cover layer 52, may detect touch inputs from a user.

Figure 16:
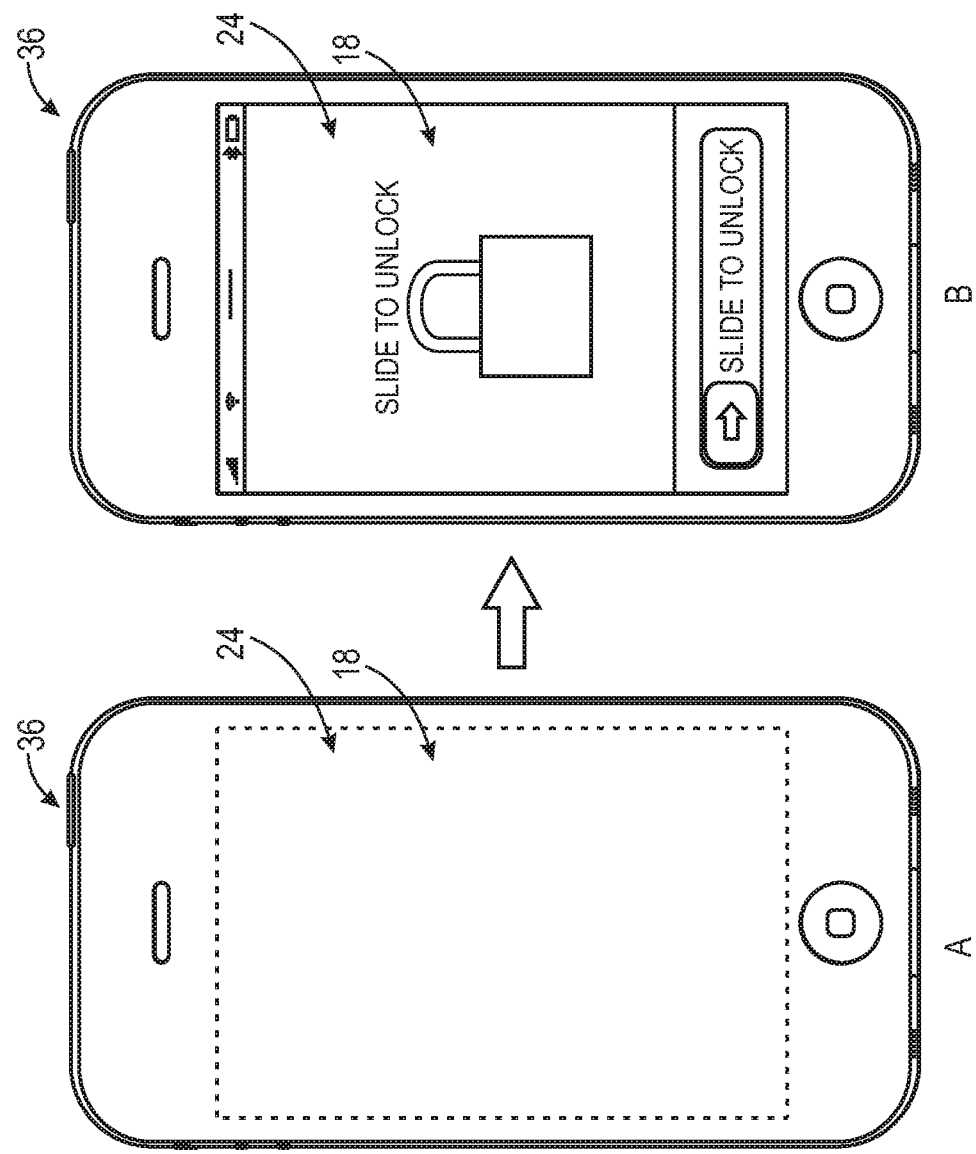
FIG. 16 is a schematic front view of a handheld device representing one embodiment of the electronic device of FIG. 1, illustrating concealment of a display of the handheld device.

In the enclosure system 50, a component 68 of the electronic device 10 may be concealed in the enclosure. This component 68 may represent any suitable component of the electronic device 10, such as the image capture device 20, the strobe 32, and/or the biometric sensor 34, to name a few. The printing layers 54 each have window cutouts 64 disposed above or below a window 24. The window cutouts 64 may allow exposure, through the printing layers 54, of the window 24 and/or a component 68 disposed underneath the window 24. The window 24 may be color-matched to the color layer 60, such that when the window 24 is selectively controlled to be opaque, the window 24 may appear indistinguishable from the printing layers 54. The window 24 may be disposed above the component 68, hiding the component 68 from view when the window 24 is opaque. The display 18 may be disposed below or alongside one or more of the transparent protective cover layer 52, the printing layers 54, and the touch layer 66, or integrated into one or more of these layers. While FIG. 4 illustrates that the window 24 is not disposed directly above the display 18, it should be noted that in some embodiments (e.g., as illustrated in FIG. 16), the window 24 may be disposed above the display 18 and may selectively conceal the display 18. When open, the window 24 will allow the component 68 to be exposed through the touch layer 66, the printing layers 54, and the transparent protective cover layer 52.

Like the enclosure system 50 of FIG. 4, in the electronic display system 80 of FIG. 5, a window 24 may conceal any suitable component 68 of the electronic device. In particular, in the electronic display system 80 of FIG. 5, the window 24 may be located behind a transparent display 18 (e.g., a transparent organic light emitting diode (OLED) display) and may selectively allow the component 68 to appear from behind the display 18 as needed. As shown in FIG. 5, the display 18 may be disposed below or alongside the transparent protective cover layer 52, the printing layers 54, and the touch layer 66. The window 24 may be disposed underneath the display 18, and, when opaque or closed, may act as a uniform, non-reflecting backing layer for the transparent display 18. At least some portion of the window 24 may be disposed above the component 68 (e.g., image capture device(s) 20 or biometric sensor 34), concealing the component 68 when the window is closed. When at least the portion of the window above the component 68 is opened, the window 24 will expose the component 68 through the transparent display 18 and the transparent protective cover layer 52.

Figure 6:
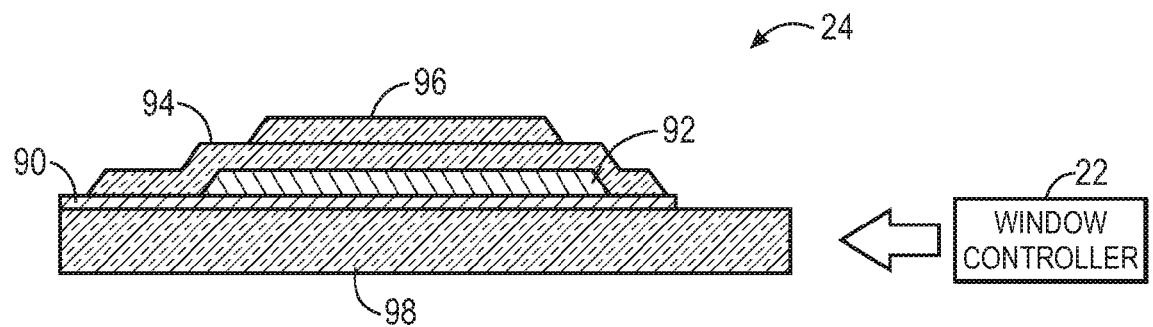
FIG. 6 is a cross-sectional view illustrating an embodiment of a window selectively configured to be opaque, and thus capable of concealing a component as disclosed herein, in accordance with an embodiment.
Figure 7:
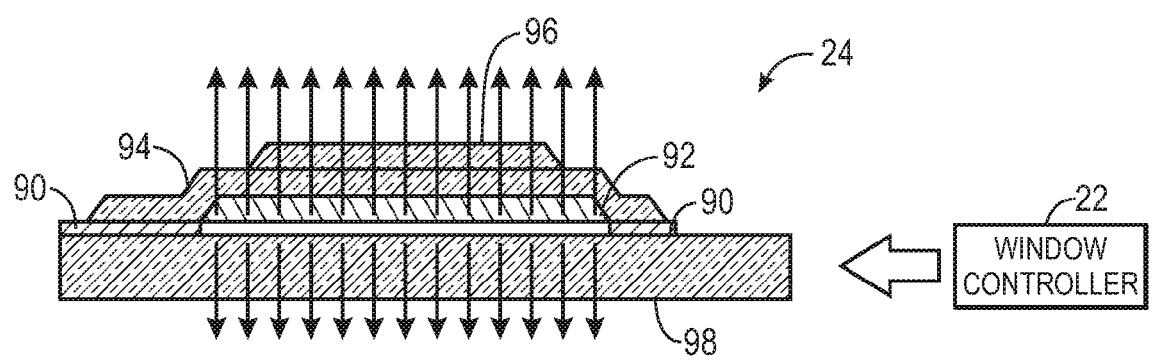
FIG. 7 is a cross-sectional view illustrating the window of FIG. 6 selectively configured to be transparent, and thus capable of exposing a component as disclosed herein, in accordance with an embodiment.

As previously discussed, one embodiment of window 24 may include a polymer dispersed liquid crystal (PDLC) window. FIGS. 6 and 7 are schematic cross-sectional views of such a PDLC window 24 controlled by a window controller 22 to be closed (FIG. 6) or opened (FIG. 7). The PDLC window 24 may include a PDLC layer 90, which may be controlled to be opened (transparent) or closed (opaque) by the window controller 22 on demand. A transparent material 92 may reside between the PDLC window layer 90 and a transparent enclosure 94 of the PDLC window 24. When the window controller 22 supplies a control signal, an electrode 96 may cause the PDLC window 24 to open or close. In some embodiments, the PDLC window 24 may become transparent or opaque by changing the orientation of the liquid crystal molecules via changes in an electric field caused by the electrode 96. The component 68 (e.g., image capture device(s) 20) to be concealed may be disposed behind the transparent enclosure 94. A transparent substrate 98 outside of the PDLC layer 90 may protect the PDLC layer 90. While the PDLC layer 90 is opaque, as shown in FIG. 6, the window 24 may be understood to be closed to conceal the component 68.

When desired, the window controller 22 may cause the PDLC window 24 to open, as represented by FIG. 7. As shown, the window controller 22 may cause the PDLC layer 90 to become transparent, by sending a control signal to the electrode 96. When the PDLC layer 90 is transparent, the component 68 may be seen through the transparent enclosure 94, the transparent material 92, and the transparent substrate 98. Additionally, external light may reach the component 68 through the transparent substrate 98, the transparent material 92, and the transparent enclosure 94.

Figure 8:
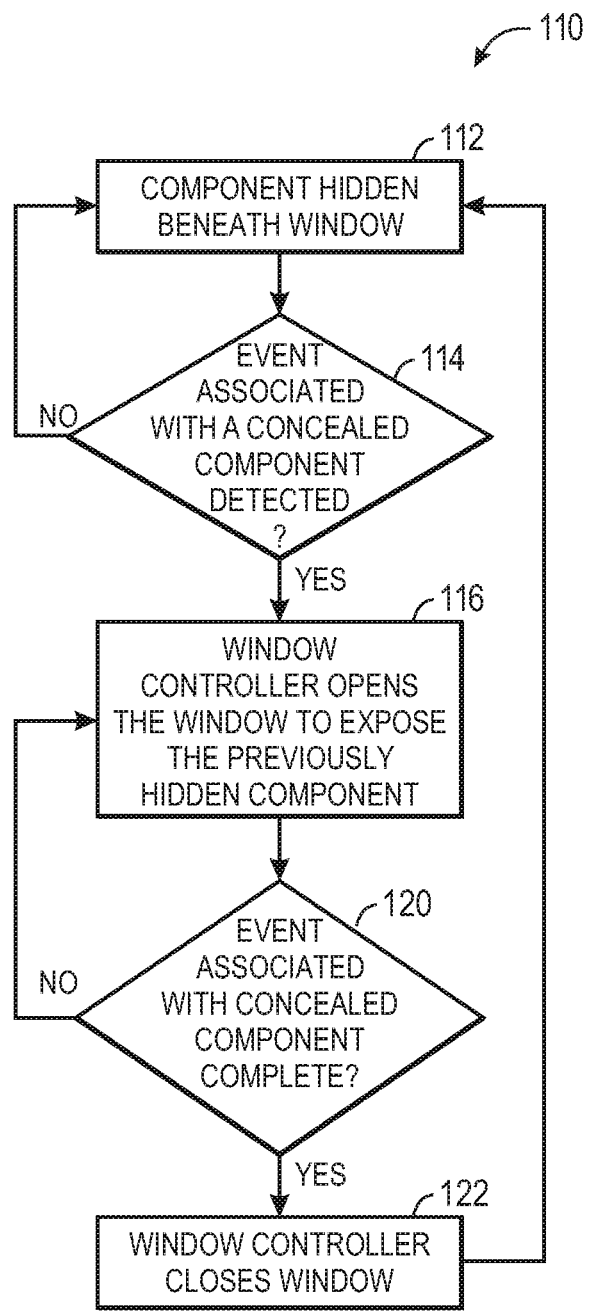
FIG. 8 is a flow chart describing an embodiment of a method for controlling the exposure of a component disposed behind a window in the electronic device of FIG. 1.

As noted above, the window(s) 24 may conceal a variety of components of the electronic device 10, such as the image capture device 20, the strobe 32, and/or a biometric sensor 34 such as a fingerprint reader, to name a few. To more clearly explain the component concealment process, a general description of such a process 110 will now be provided as depicted in FIG. 8. The process 110 is intended to provide an initial high level overview of the concealment process, with more specific details of the process, including examples, being described further below.

The process 110 begins at block 112, when a component 68 (e.g., image capture device(s) 20) is concealed beneath a window 24. Next, at decision block 114, the electronic device 10 may detect whether an event associated with the component 68 has occurred. If no such event has occurred, the component 68 may remain concealed behind the window 24, and the process may flow to block 112. On the other hand, if such an event has occurred, the process may flow to block 116, and the window controller 22 may open the window 24 to expose the component 68. At decision block 120, the electronic device 10 may detect whether the event associated with the component 68 has completed. If not, the component 68 may remain exposed. Once the electronic device 10 detects that the event is complete, in block 122, the window controller 22 may close the window 24, thus concealing the component 68.

Figure 9:
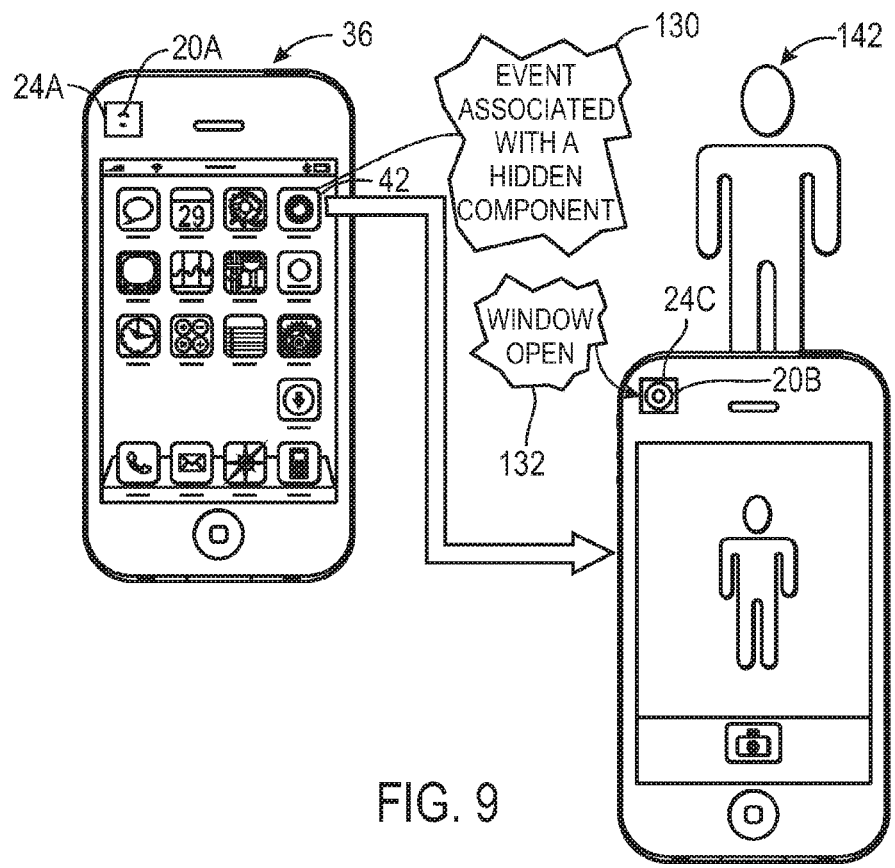
FIG. 9 is a schematic diagram illustrating image capture functionality from a forward facing image capture device, exposed from behind a window, in accordance with an embodiment.
Figure 10:
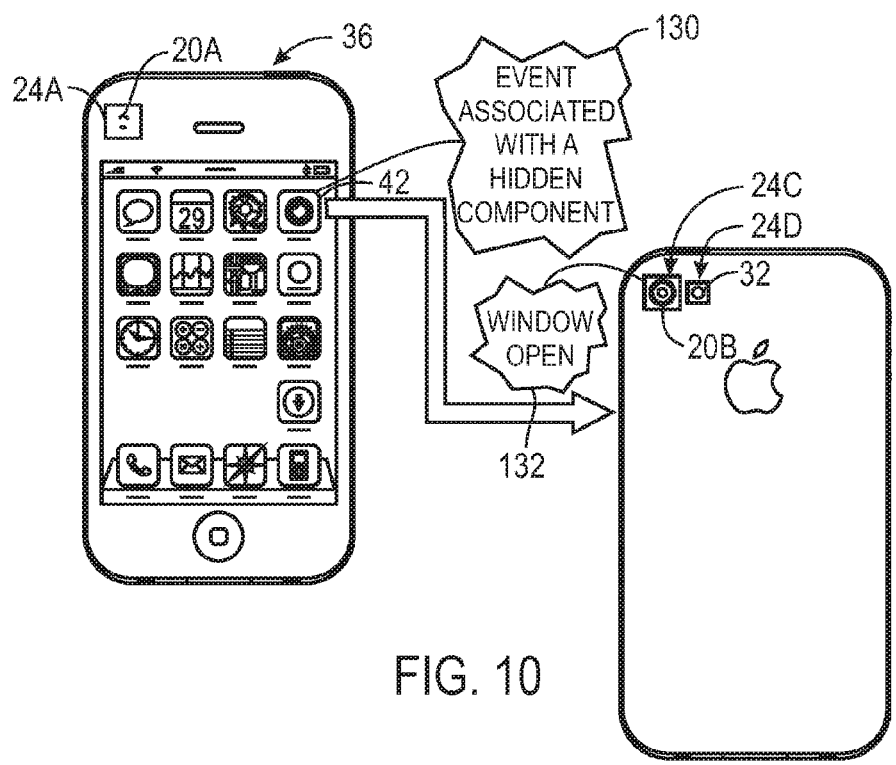
FIG. 10 is a schematic diagram illustrating image capture functionality from a rear facing image capture device, exposed from behind a window, in accordance with an embodiment.

An embodiment of the process 110 depicted in FIG. 8 is illustrated in FIG. 9. In FIG. 9, the handheld device 36 is shown to contain an image capture device 20 disposed behind a closed window 24. Upon selection of an image capture application by selecting the graphical user interface icon 42, the camera application is launched. The launching of the camera application may represent an event associated with the image capture device 20. Upon detection of the such an event 130, the window controller 22 of FIG. 1 may open the window 24 as illustrated by numeral 132. Thus, the image capture device 20 may be exposed, allowing images to be captured by the exposed image capture device 20. FIG. 10 represents a similar embodiment illustrating that the windows 24C and 24D may alternatively or additionally be opened 132 on the back of the handheld device 36, exposing, for instance, an additional image capture device 20 and/or an LED strobe 32 when the camera application is launched.

Figure 11:
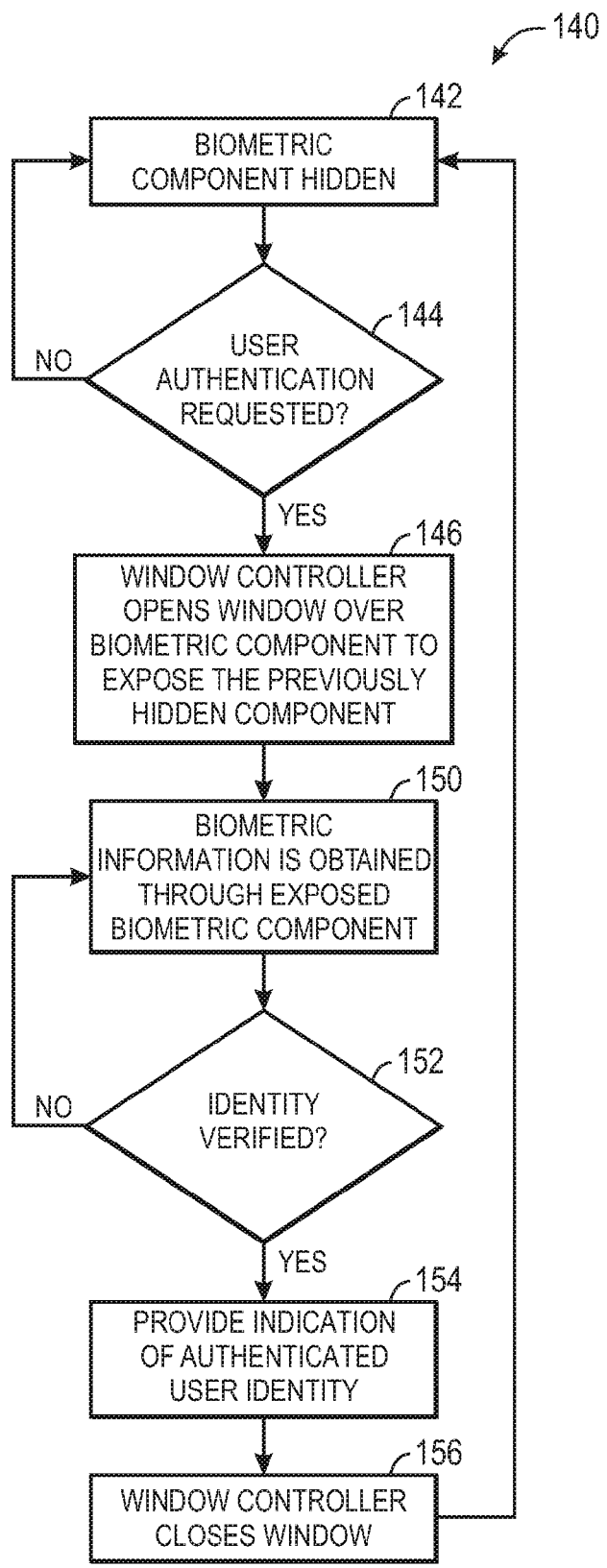
FIG. 11 is a flow chart describing an embodiment of a method for authenticating a user of an electronic device by using a biometric sensor component disposed behind a window in the electronic device of FIG. 1.

The component concealment process may, in some embodiments, be utilized when authenticating a user of the electronic device 10. FIG. 11 depicts such a process 140 involving the concealment and exposure of a biometric sensor 34. In block 142, a biometric sensor 34 (e.g., a fingerprint reader or an image capture device 20), may be hidden behind a window 24. The electronic device 10, in decision block 144, may detect a request for authenticating a user identity. Examples of events where authenticating a user may be desirable may include unlocking the electronic device 10 or making an electronic purchase. Upon detection of such a request, a window controller 22 may open a window 24 over the concealed biometric sensor 34, as shown in block 146. Thus, the previously hidden biometric sensor 34 may be exposed for use. At block 150, the electronic device 10 may obtain biometric information through the biometric sensor 34. In decision block 152, the electronic device 10 may attempt to verify the identity of the user based at least partly on the biometric information obtained by the biometric sensor 34 using any suitable technique. If an identity cannot be verified, the biometric sensor 34 may continue to be exposed, and may try to obtain biometric data again. Once the electronic device 10 has verified the user identity, the electronic device 10 may indicate that the identity has been verified, as indicated in block 154. Next, in block 156, the window controller 22 may close the window 24, concealing the biometric sensor 34 behind the window 24 once more.

Figure 12:
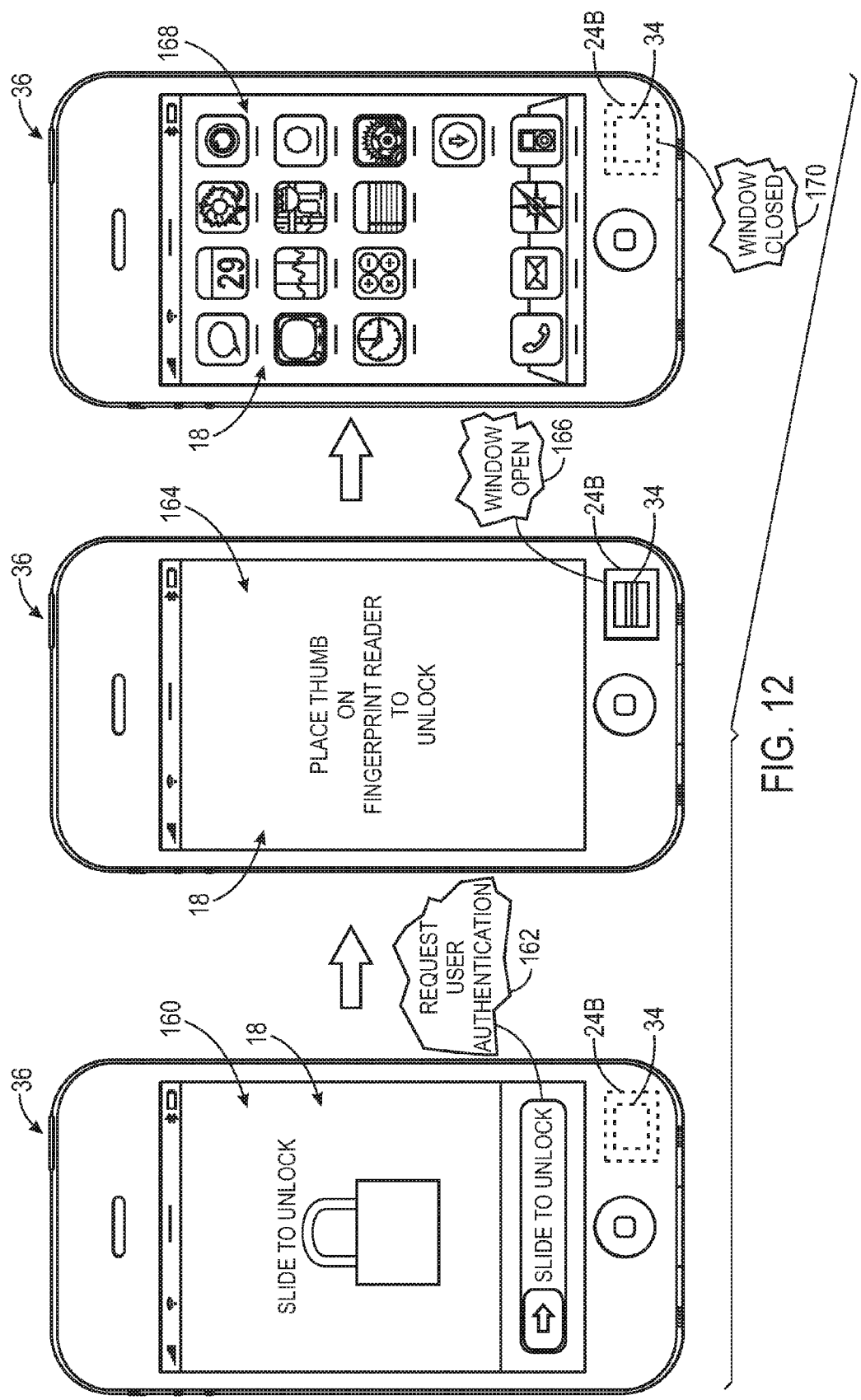
FIGS. 12-14 are schematic diagrams representing processes for unlocking an electronic device by authenticating a user using a concealed biometric sensor of the electronic device of FIG. 1, in accordance with embodiments.

An embodiment of the process 140 described in FIG. 11 is illustrated in FIG. 12. As illustrated, a biometric sensor 34, here a fingerprint reader, is initially concealed behind a closed window 24B in handheld device 36. Upon activation of the handheld device 36 in a locked state, a lock screen 160 may be displayed requesting a user to slide a finger across the display 18 to unlock the handheld device 36. When the electronic device 10 detects a user desire to unlock the electronic device 10 (e.g., a slide gesture across the screen), the electronic device 10 may request 162 user authentication to access the handheld device 36. Upon such a request 162, the electronic device 10 may display an instruction screen 164 requesting that a user provide biometric data (e.g., a fingerprint) to the biometric sensor 34 (e.g., the fingerprint reader). The biometric sensor 34 may be exposed by opening 166 the window 24B through a signal provided by the window controller 22. Upon the verification of the user's identity by the electronic device 10, home screen 168 is displayed on display 18, and the window 24B is closed 170, thus concealing the biometric sensor 34.

Figure 13:
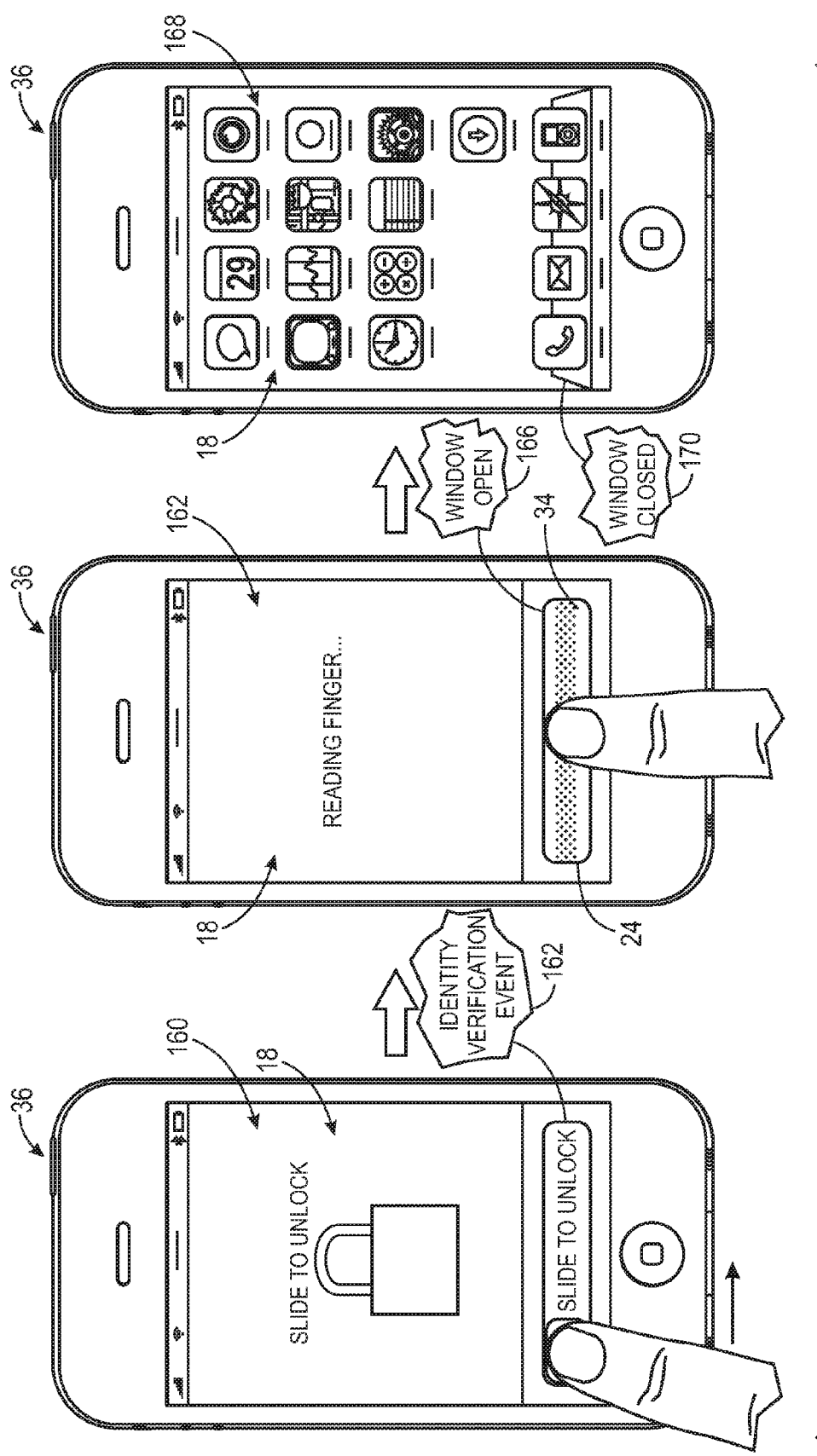

Various forms of user input may cause exposure of a component 68 (e.g. image capture device(s) 20) of FIGS. 4 and 5 behind a window 24. FIG. 13 is an alternative embodiment to the process 140 described in FIG. 11 where a finger swipe across an area of the display 18 exposes a biometric sensor 34 beneath the area of the swipe.

Figure 14:
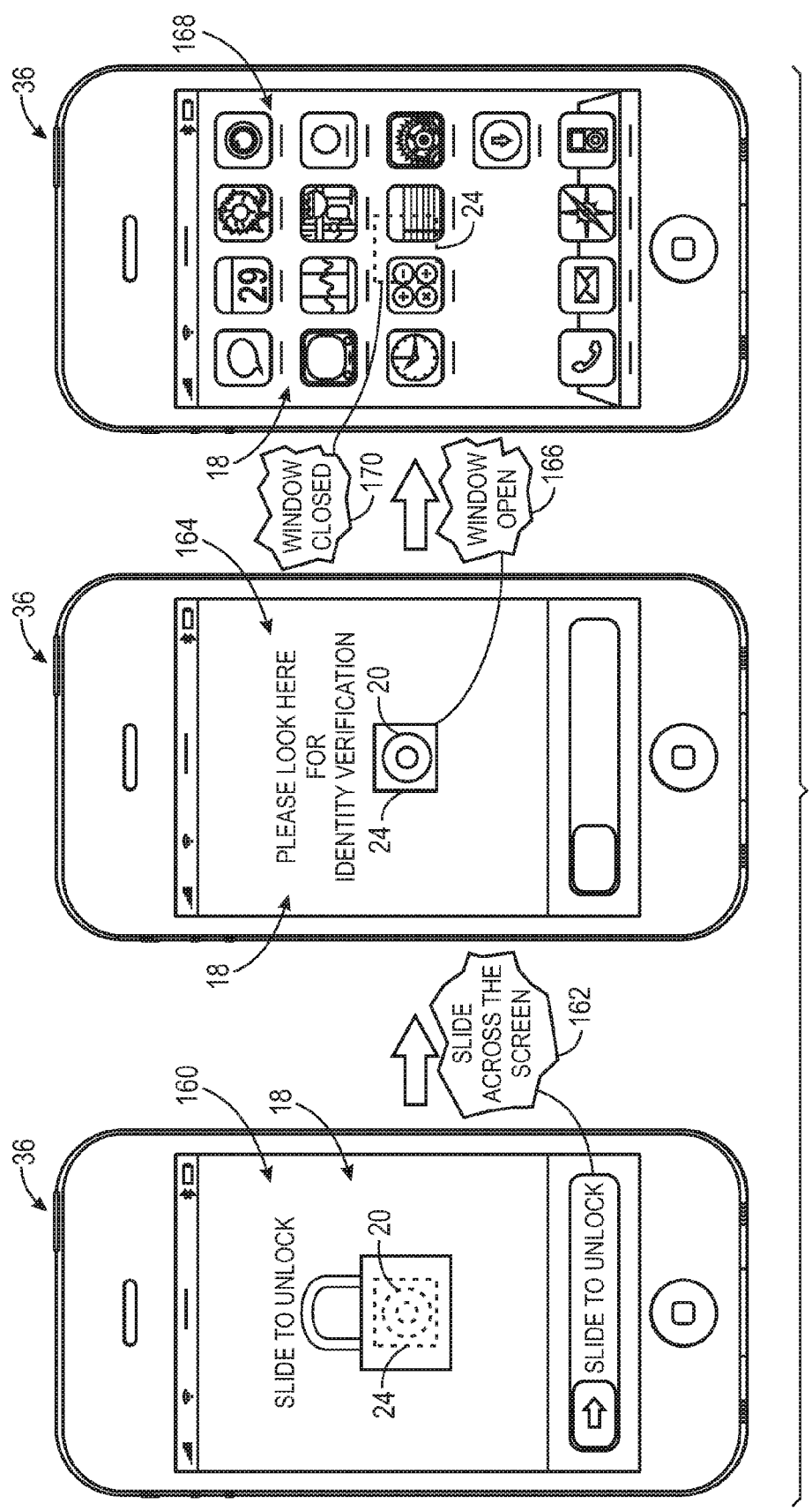
Figure 15:
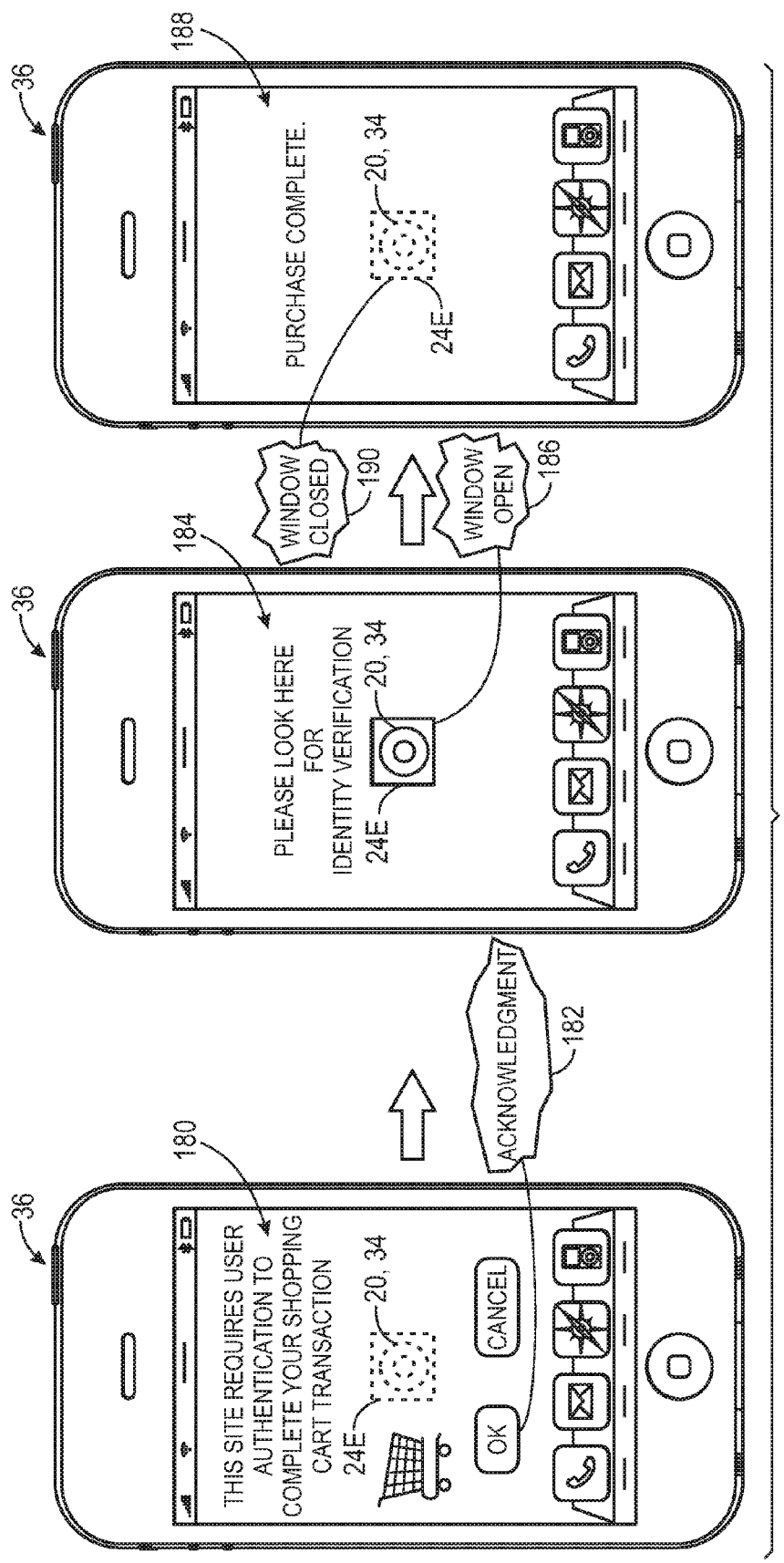
FIG. 15 is a schematic diagram representing a process for authenticating a user of an electronic device, using a concealed biometric sensor, during an e-commerce transaction on the electronic device of FIG. 1, in accordance with an embodiment.

As illustrated in FIG. 13-15, when the display 18 is a transparent display such as a transparent OLED display, certain components of the electronic device 10 may be concealed behind the display 18. Disposing components behind the display 18 may further increase the aesthetic appeal of the electronic device 10 by allowing components of the electronic device 10 to be placed in locations that a user might not typically expect. For example, as shown in FIG. 13, which represents one embodiment of the current techniques, a biometric sensor 34 (e.g., a fingerprint reader) may be located beneath the transparent display 18. In the presently disclosed embodiment, upon detecting a desire to use the biometric sensor 34 of FIG. 13, the window 24 above the biometric sensor 34 may open, thus providing access to the biometric sensor 34 beneath the display 18.

Initially, as depicted in FIG. 13, the electronic device 10 (here, a handheld device 36) may display a lock screen 160. As the electronic device 10 detects a slide gesture across the display 18, the electronic device 10 may request 162 user authentication to access the handheld device 36. As the slide gesture occurs, the window controller 22 of FIG. 1 may open a window 24 disposed beneath the transparent display 18, exposing a biometric sensor 34 (e.g., a fingerprint reader). Thus, at the same time the user's finger slides across the screen of the display 18, the biometric sensor 34 may appear from beneath the display 18 to obtain fingerprint information from the user. Concurrently, the electronic device 10 may display an instruction screen 164 explaining that identity verification is taking place. For example, the instruction screen 164 may indicate that a fingerprint is being scanned as depicted in FIG. 13. The electronic device 10 may then attempt to verify the user identity based at least partly on the obtained fingerprint information. Once identity verification is complete, the window 24 may be closed 170, concealing the biometric sensor 34, and the electronic device 10 may be unlocked.

An alternative embodiment of the process 140 described in FIG. 11 appears in FIG. 14. FIG. 14 illustrates an image capture device 20 concealed behind a transparent display 18 to obtain user authentication. Initially, the electronic device 10 (here, the handheld device 36) may display a lock screen 160. A window 24 disposed beneath a transparent display 18 initially may be closed. An image capture device 20 may be disposed behind the window 24, concealing the image capture device 20. Upon detecting a slide gesture across the display 18, the electronic device 10 may make a request 162 for user authentication, and the electronic device 10 may display an instruction screen 164 prompting the user to look towards the image capture device 20. As the instruction screen 164 is displayed, the window 24 may open to expose the image capture device 20 from beneath the display 18. The image capture device 20 may then obtain biometric image information (e.g., based on the user's face or eye) and the electronic device 10 may verify the user's identity. Upon identity verification, the electronic device 10 may close 170 the window 24 and display the home screen 168.

User authentication is not limited to unlocking an electronic device 10. FIG. 15 illustrates the process 140 described in FIG. 11 in an e-commerce context. To complete a shopping transaction online, many e-commerce websites may require identity verification before the order can be completed. When such a transaction occurs using an electronic device 10 (here, the handheld device 36), the electronic device 10 may provide an authentication screen 180 explaining that user authentication is required to complete the transaction. Upon acknowledgement 182 of authentication screen 180, the electronic device 10 may open 186 a window 24E to expose a biometric sensor 34, here shown as an image capture device 20. Additionally, the electronic device 10 may display an authentication screen 184 providing instructions for the user so that authentication information may be obtained. For example, as previously discussed, the image capture device 20 may obtain biometric identity information based on the user's face or eye and the electronic device 10 verifies the identity. Upon verification of the user identity, the electronic device 10 may provide an indication that the identity has been verified. The purchase may be completed, and a completed transaction screen 188 may be displayed. Additionally, the window controller 22 may close 190 the window 24E, thus re-concealing the image capture device 20.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device comprising:
 a window configured to selectively become transparent or opaque;
 a component disposed behind the window, wherein the component comprises an image capture device, a strobe flash, a biometric sensor, a light sensor, a proximity sensor, or a solar panel, or a combination thereof;
 data processing circuitry configured to determine when an event associated with the use of the component occurs; and
 a window controller configured to cause the window to become transparent during the occurrence of the event and become opaque after the event is complete.

2. The electronic device of claim 1, wherein the event comprises a camera application requesting that the camera, the strobe flash, or both be used or exposed.

3. The electronic device of claim 1, wherein the event comprises unlocking the electronic device by user authentication via the biometric sensor.

4. The electronic device of claim 1, wherein the event comprises an e-commerce transaction requesting user authentication via the biometric sensor.

5. The electronic device of claim 1, wherein the window comprises a polymer dispersed liquid crystal window.

6. A method comprising:
 detecting an event associated with the use of a biometric sensor, an image capture device, or a strobe flash, or a combination thereof, of an electronic device be used or exposed using data processing circuitry of the electronic device; and
 upon detection of the event, controlling a window to become transparent to expose the biometric sensor, the image capture device, or the strobe flash, or the combination thereof using a window controller of the electronic device; and
 after occurrence of the event, controlling the window to become opaque.

7. The method of claim 6, wherein the event occurs when an image capture feature of the electronic device is expected to use the component and wherein the component comprises the image capture device.

8. The method of claim 6, wherein the event occurs when a feature of the electronic device is expected to activate a light emitting diode associated with an image capture device and wherein the component comprises the light emitting diode.

9. The method of claim 6, comprising generating the event using the data processing circuitry when an image capture feature of the electronic device prepares to capture an image using the component, wherein the component comprises an image capture device.

10. The method of claim 6, comprising generating the event when an element of a graphical user interface of the electronic device is selected on the electronic device.

11. The method of claim 6, wherein the window is controlled to expose the biometric sensor, wherein the biometric sensor comprises a fingerprint reader.

12. An article of manufacture comprising:
 a non-transitory machine-readable media having instructions encoded thereon for execution by a processor, the instructions comprising: instructions to detect an event associated with the verification of a user identity in an electronic device;
 instructions to cause a window of the electronic device to be transparent based at least in part on the event to expose a biometric sensor behind the window;
 instructions to obtain user biometric data via the biometric sensor;
 instructions to verify a user identity based at least in part on the user biometric data; and
 instructions to cause the window to become opaque after obtaining the user biometric data.

13. The article of manufacture of claim 12, wherein the instructions to detect the event associated with the verification of a user identity comprise instructions to detect a user desire to unlock the electronic device when the electronic device is locked.

14. The article of manufacture of claim 13, wherein the instructions to detect the user desire to unlock the electronic device comprise instructions to detect a swipe touch gesture across a location of a display of the electronic device.

15. The article of manufacture of claim 12, wherein the event associated with the verification of a user identity comprises an event taking place during a financial transaction in which the user identity is requested.

16. The article of manufacture of claim 12, wherein the instructions comprise: instructions to detect the end of the event associated with the verification of the user identity; and instructions to cause the window to be opaque when the end of the event is detected.

17. An electronic display comprising:
a transparent-OLED display;
a window layer disposed behind the display, wherein the window layer is configured to selectively become transparent or opaque; and
a window controller configured to change the opacity of the window layer to expose a component disposed behind the window layer based on the use of the component.

18. The electronic display of claim 17, wherein the window controller is configured to change the opacity of a plurality of portions of the window layer having a respective plurality of locations, shapes, or sizes, or combinations thereof.

* * * * *